United States Patent

Yahata

[11] Patent Number: 5,917,651
[45] Date of Patent: Jun. 29, 1999

[54] WINDOW STRUCTURE OF AN INDICATOR UNIT

[75] Inventor: Noriaki Yahata, Konan, Japan

[73] Assignee: Zexel Corporation, Tokyo, Japan

[21] Appl. No.: 09/081,645

[22] Filed: May 20, 1998

[51] Int. Cl.[6] .................................. G02B 17/06
[52] U.S. Cl. .................. 359/439; 359/440; 359/894
[58] Field of Search .................... 359/436–440, 359/894, 896, 609

[56] References Cited

U.S. PATENT DOCUMENTS 3,650,599  3/1972  Pedersen ............................. 359/439
3,747,413  7/1973  Barrett et al. ....................... 359/436

Primary Examiner—James Phan
Attorney, Agent, or Firm—Wenderoth, Lind & Ponack, L.L.P.

[57] ABSTRACT

A reflecting surface is formed at a rear side of a thick portion so that when viewed from the center front relative to the thick portion, light is reflected by the reflecting surface to let the color of the panel be seen as the color of the thick portion. With this, the confusing visual aspect of the window member of the indicator unit that occurs when the color of the thick portion of the window member looks different from the color of the other portion of the window member can be eliminated without having to color the rear surface side of the thick portion.

12 Claims, 5 Drawing Sheets

WINDOW STRUCTURE OF AN INDICATOR UNIT

BACKGROUND OF THE INVENTION

1. Field of the Invention

The present invention relates to an indicator unit provided at a panel employed at a control station, and in particular, an indicator unit provided at a panel employed at a control station that constitutes an input source for various types of input for an air conditioning system for vehicles and, more specifically, it relates to a structure of a window that no covers the surface of the indicator unit.

2. Description of the Related Art

In an control station of this type for an air conditioning system for vehicles, an indicator unit for indicating the air conditioning temperature, the selected discharge mode and the like is provided at a panel together with input switch buttons, as illustrated in FIG. 2 of Japanese Unexamined Utility Model Publication No. H7-41919, for instance.

Figure 5:
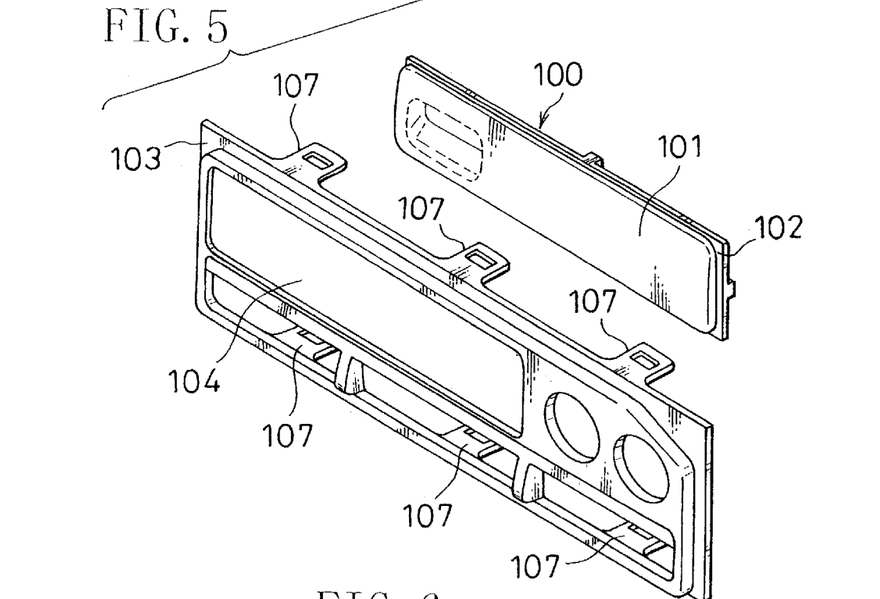
FIG. 5 is a perspective illustrating the structure of a window member of an indicator unit and a panel at which the window member of the indicator unit is fitted in the prior art.
Figure 6:
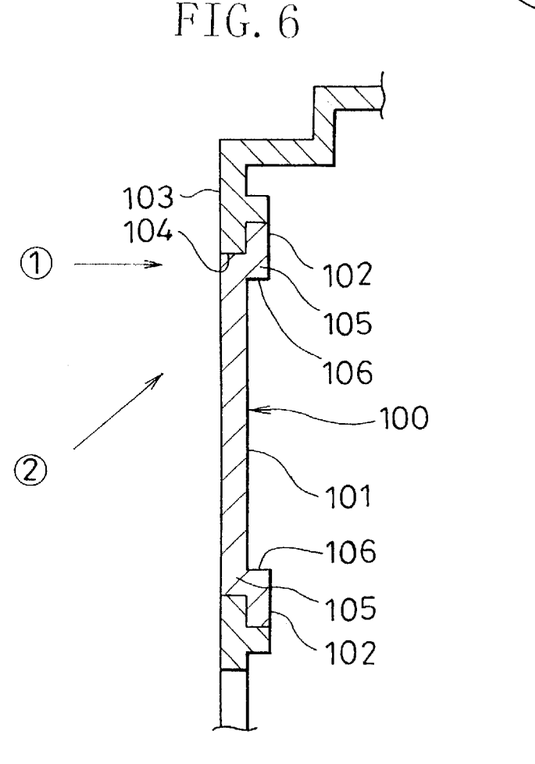
FIG. 6 is a cross section illustrating the window member of the indicator unit in the prior art fitted at the opening portion of the panel.

While specific details of this indicator unit are not disclosed in the publication mentioned above, its surface will, under normal circumstances, be covered by a window member 100, as illustrated in FIGS. 5 and 6 in the specification of the present invention. The window member 100, which is constituted of a colorless transparent member, comprises a main body 101 and a flange 102 formed on the outside thereof. In addition, a stage is formed between the main body 101 and the flange 102 and a thick portion 105 whose edge surface 106, which constitutes the side facing the center of the window member 100, is formed in the area of the flange 102 where the flange 102 overlaps the main body 101, so that the main body 101 faces opposite an opening portion 104 of a panel 103 and that the flange 102 constitutes a retaining portion that comes in contact with the internal circumferential surface of the opening portion 104 when the window member 100 is fitted at the opening portion 104.

Thus, the window member 100 is mounted at the panel 103 with the portion of the main body 101 that overlaps the thick portion 105 positioned at the circumferential edge of the opening portion 104 by fitting the window member 100 at the opening portion 104 of the panel 103 from the rear side of the panel 103 until the flange 102 comes in contact with the opening portion 104, as illustrated in FIG. 6.

However, with the window member 100 structured as described above, when the window member 100 is viewed from the front and center (the direction indicated with the arrow 1 in FIG. 6) or from below in a diagonal direction (indicated with the arrow 2 in FIG. 6), the edge surface 106 of the thick portion 105 will reflect light or absorb light to appear dark thereby causing the main body 101 to appear to have double lines toward the center relative to the edge of the opening portion 104.

In addition, when the window member 100 is viewed from the center front direction (indicated with the arrow 1 in FIG. 6), the thickness of the thick portion 105 causes its color to look different from the color of the main body 101 or the panel 103, causing the area of the main body 101 that overlaps the thick portion 105 to take on the appearance of a picture frame.

These conditions pose a problem in that the window member 100 will present a confusing visual aspect to the user and will, therefore, appear to have been poorly designed and made.

As a means for improving the external appearance of the window member 100, the rear surface side of the thick portion 105 may be colored in the same color as the panel 103 or in black by performing silkscreen printing on the rear surface of the thick portion 105 (not shown).

However, there is a concern that the printing work and the like may become difficult if there are indentations or projections in the area to be printed. In addition, when performing silkscreen printing at the thick portion 105, it is necessary to accurately mask the area surrounding the portion to be printed, which complicates the work process and causes an increase in production cost.

Furthermore, coloring the rear surface side of the thick portion 105 in the same color as that of the panel 103 or in black, does not eliminate the problem of the edge surface 106 of the thick portion 105 reflecting or absorbing light, to make it look dark, causing the main body 101 to appear to have double lines toward the center relative to the edge of the opening portion 104.

SUMMARY OF THE INVENTION

Accordingly, an object of the present invention is to provide a window structure that may be adopted in an indicator unit with which it is possible to eliminate the problem of confusing visual aspect caused by the color of the thick portion of the window member appearing different from the color of the other portions without having to color the rear surface side of the thick portion and to prevent the appearance of double lines toward the center relative to the edge of the opening portion.

Thus, in the window structure of an indicator unit according to the present invention, which is constituted by fitting a transparent window member through which information can be seen at an opening portion of a panel constituted of an opaque member, the opening portion is constituted of a first opening portion opening at the external surface of the panel and a second opening portion continuous to the first opening portion, which opens toward the internal surface of the panel over an internal circumferential width that is larger than that of the first opening portion, and the window member is constituted of a main body whose side edge portions face opposite the side circumferential surfaces of the first opening portion and a flange whose side edge portions face opposite the side circumferential surfaces of the second opening portion with the flange having a thick portion in the area overlapping the main body and a reflecting surface formed at the thick portion.

Thus, when the indicator unit is viewed from a direction front and center relative to the thick portion, the side circumferential surfaces of the second opening portion are reflected by the reflecting surface to appear on the surface of the main body as a virtual image, resulting in the color of the main body appearing the same as the color of the panel, at least along the width of the thick portion, to prevent the main body from taking on the appearance of a picture frame.

In addition, the reflecting surface is formed by continuously increasing the thickness of the thick portion toward the external circumference, or it may be constituted of an inclining surface that inclines at the rear side of the thick portion at a specific angle. Alternatively, it may be constituted by forming the rear surface side of the thick portion as a curved surface.

With this, since no edge surface that may reflect or absorb light to make it look dark is present toward the center of the window member with the thickness of the thick portion continuously increased toward the external circumference, it is possible to prevent the main body from appearing to have double lines toward the center relative to the side edges of the opening portion.

Alternatively, in the window structure of an indicator unit according to the present invention, which is constituted by fitting a transparent window member through which information can be seen at an opening portion of a panel constituted of an opaque member, the opening portion is constituted of a first opening portion opening toward the external surface of the panel and a second opening portion continuous to the first opening portion, which opens toward the internal surface of the panel over an internal circumferential width larger than that of the first opening portion, and the window member is constituted of a main body whose side edge portions face opposite the side circumferential surface of the first opening portion and a flange whose side edge portion faces opposite the side circumferential surface of the second opening portion with the flange having a thick portion in the area overlapping the main body and a reflecting surface formed by providing a reflecting member at the rear surface of the thick portion. In addition, if the reflecting member is constituted of a metal material, the reflecting surface of the reflecting member may be formed by mirror finishing the side surfaces of the thick portion in the reflecting member, whereas if the reflecting member is constituted of a synthetic resin material, the reflecting surface may be constituted by plate coating the surface of the reflecting member.

Through this structure, too, when the indicator unit is viewed from a direction front and center relative to the thick portion, the side circumferential surface of the second opening portion is reflected by the reflecting surface to appear on the surface of the main body as a virtual image resulting in the color of the main body appearing as the same as the color of the panel to prevent it from taking on the appearance of a picture frame as a result of the color of the portion of the main body overlapping the thick portion looking different from the color of the panel and the other portions of the main body. Furthermore, even when the window member at the indicator unit is viewed from below in a diagonal direction, the edge surface toward the center of the window member is hidden by the reflecting member so that it will not reflect light, thereby preventing the main body from appearing to have double lines toward the center relative to the side edges of the opening portion.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments. In the drawings.

DETAILED DESCRIPTION OF THE PREFERRED EMBODIMENTS

The following is an explanation of the preferred embodiments of the present invention in reference to the drawings.

Figure 1:
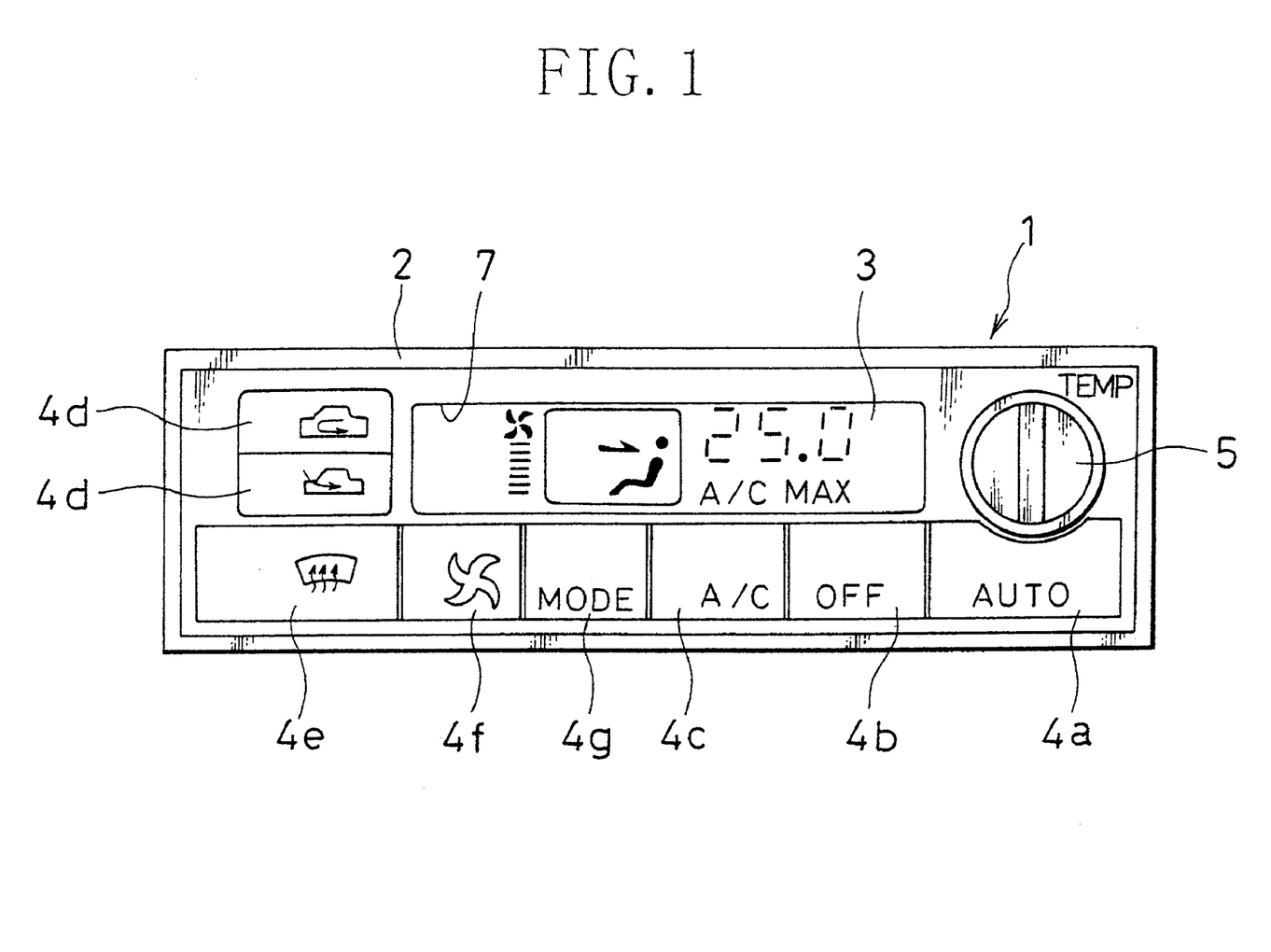
FIG. 1 is a front view illustrating the structure of a control station in which the window member of the indicator unit according to the present invention is adopted.

In FIG. 1, a control station 1 which constitutes an input source for various types of input at an air conditioning system for vehicles is illustrated. At a panel 2 of the control station 1, an indicator unit 3 for indicating information such as the outlet air temperature, the selected mode and the rotation level of the air blower and the like, an auto switch button 4a for setting an auto mode for all the operations, an OFF switch button 4b for turning off all operations, an air conditioning switch button 4c, an internal/external air selector switch button 4d, a defrost switch button 4e, a blower switch button 4f for switching the air blower rotation rate, a mode selector switch button 4g for switching the discharge mode and a control turn knob 5 for temperature adjustment are provided.

Figure 2:
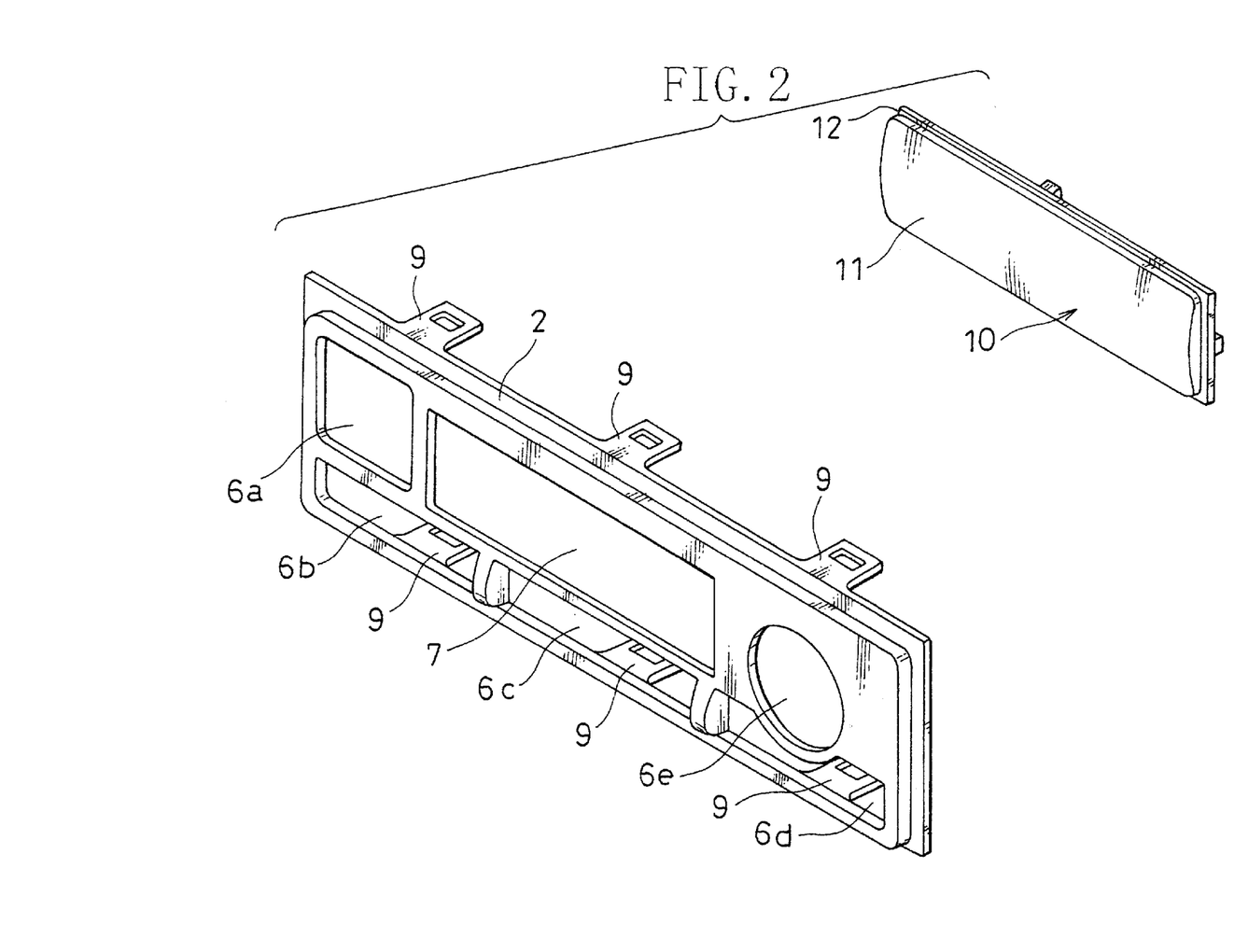
FIG. 2 is a perspective illustrating the structure of the panel and the window member at an indicator unit that is to be fitted at the opening portion of the panel.

In this embodiment, the panel 2 is constituted of acrylonitrile-butadiene styrene (ABS) and is colored in an opaque black in its entirety. In addition, opening portions 6a~6e at which the buttons 4a~4g and the control turn knob are fitted are formed at the surface of the panel 2, and a roughly rectangular opening portion 7 is formed at a position at which the indicator unit 3 is to be provided, as illustrated in FIG. 2.

Figure 3A:
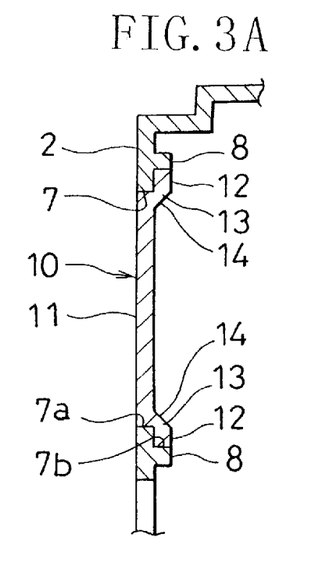
FIG. 3A is a schematic cross section illustrating the window member of the indicator unit fitted at the opening portion of the panel and FIG. 3B is an enlargement of an essential portion of FIG. 3A.
Figure 3B:
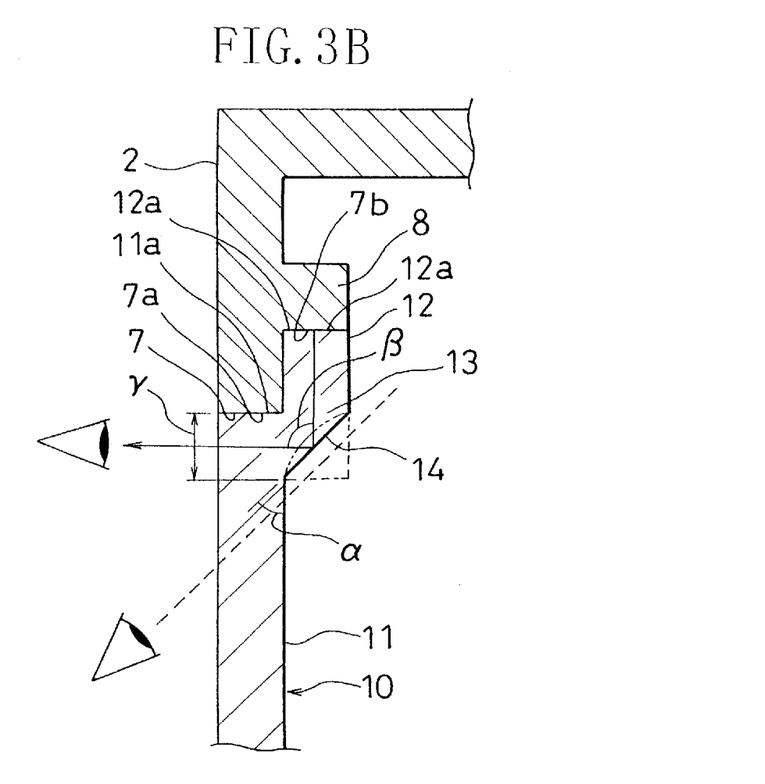

At the opening portion 7, a stage is formed by sequentially and continuously providing a first opening portion 7a and a second opening portion 7b which is constituted by providing a projecting portion 8 projecting inward from the internal surface of the panel 2 having a larger internal surface width than the first opening portion 7a, as illustrated in FIGS. 3A and 3B. In addition, at the portions which will constitute the upper end and the lower end when the panel 2 is mounted, a plurality of mounting pieces 9 (not shown) for mounting the panel at an air conditioning control system are provided extending from the rear side of the panel 2 in a direction that is almost at a right angle to the panel 2.

Furthermore, a window member 10 constituted of a colorless, transparent member is employed as a surface cover of the indicator unit 3. In this embodiment, the window member 10 is constituted of polymethyl methacrylate (PMMA), and comprises a main body 11 constituting the main element and a flange 12 formed at the circumferential edges of the main body 11. The flange 12 is positioned receding further inward than the main body 11 by the thickness of the main body 11, and overlaps the main body 11 to constitute a thick portion 13. A side edge portion 11a of the main body 11 comes in contact with the side circumferential surface of the first opening portion 7a, and the flange 12 comes in contact with the staged surface of the second opening portion 7b where the stage is formed from the first opening portion 7a, with its side edge portion 12a facing opposite the side circumferential surface of the second opening portion 7b. It is to be noted that while the side edge portion 12a of the flange 12 is in contact with the side edge surface of the second opening portion 7b of the panel 2 in this embodiment, there may be a slight gap between them.

Moreover, the thickness of the thick portion 13 continuously increases toward the external circumference in this embodiment and, as a result, its internal surface side constitutes a reflecting surface 14 having an angle of inclination alpha of 45° relative to the external surface of the main body 11. However, the angle of inclination is not restricted to 45° as long as a reflecting angle beta that allows the internal circumferential surface of the second opening portion 7b to be reflected as a virtual image on the surface of the portion of the main body 11 that overlaps the thick portion 13 is achieved. In addition, the reflecting surface 14 does not necessarily have to be formed as a flat surface, as long as a structure in which the thickness of the thick portion 13 continuously increases toward the external circumference is achieved as explained above and, for instance, may be formed as a curved surface, as indicated with the two-point chain line in FIG. 3B.

Consequently, by adopting the structure of the window member 10 described above at the indicator unit, when the window member 10 is fitted at the opening portion 7 of the panel 2 from the side where the second opening portion 7b is provided, as illustrated in FIG. 2, the portion of the main body 11 that overlaps the thick portion 13 is positioned at the circumferential edge of the opening portion 7 with the side edge portion 12a of the flange 12 facing opposite the side circumferential surface of the second opening portion 7b, as illustrated in FIG. 3.

Thus, as illustrated in FIG. 3B, when the window member 10 is viewed from the center front relative to the thick portion 13, the internal circumferential surface of the second opening portion 7b is reflected at the reflecting surface 14 to be seen as a virtual image over a specific color width delta from the end of the main body 11 of the window member 10, i.e., from the opening width reflected at the portion of the surface of the main body 11 that overlaps the thick portion 13 so that the black color of the panel 2 is seen as the color of the main body 11 to prevent the portion of the main body 11 that overlaps the thick portion 13 from taking on the appearance of a picture frame. It is to be noted that when the reflecting surface 14 is constituted as a curved surface, the color width delta over which the color of the panel 2 is seen, spreads to a certain degree over the portion of the main body 11 that does not overlap the thick portion 13 as well. In addition, by forming the central side surface of the thick portion of the window member 10 as an inclining surface or a curved surface instead of an edge surface, it does not reflect light to look shiny, or it does not absorb light to appear dark, even when viewed from below in a diagonal direction, for instance.

Now, while the explanation has been given on an example in which the reflecting surface 14 is achieved by continuously increasing the thickness the thick portion 13 of toward the external circumference, the present invention is not limited to this, and a separate reflecting member 15 may be employed apart from the thick portion 13. An embodiment of this structure is explained in reference to FIGS. 4A and 4B. It is to be noted that the same reference numbers are assigned to components identical to those in the previous embodiment to preclude the necessity for an explanation thereof, and an explanation of the window member 10 and a reflecting member 15 is given below.

Figure 4A:
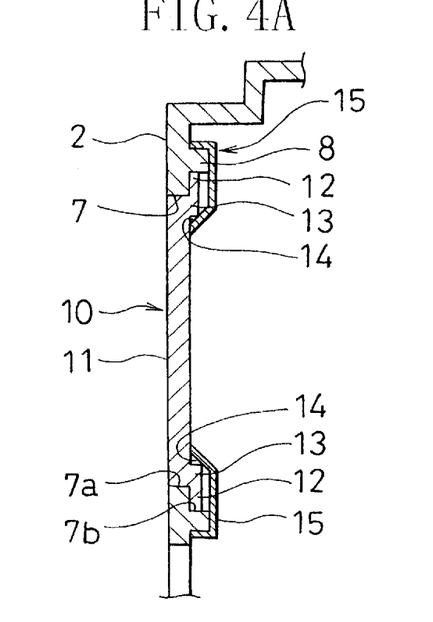
FIG. 4A is a schematic cross section illustrating the window member of the indicator unit fitted at the opening portion of the panel with the reflecting member provided behind the window member and FIG. 4B is an enlargement of an essential portion of FIG. 4A.
Figure 4B:
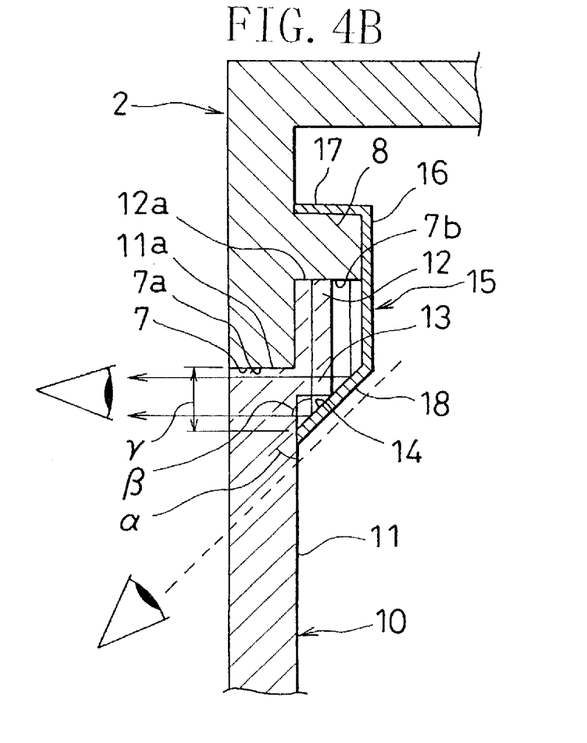

The window member, which is constituted of the same material (PMMA) as that used in the previous embodiment, comprises a main body 11 constituting the main element thereof and a flange 12 formed at the circumferential edge of the main body 11, with the flange 12 provided at a position receded further inward from the main body 11 by the thickness of the main body 11 and overlapping the main body 11 to constitute a thick portion 13, as in the previous embodiment. However, the thickness of the portion of the flange 12 that does not overlap the main body 11 is set to ensure that it does not reach the rear surface side edge of the second opening portion 7b. In addition, by setting the thickness of the thick portion 13 to be consistent throughout and the same as the thickness of the flange 12, a stage is formed at the boundary of the area where the thick portion 13 and the main body 11 overlap with each other and the area where the thick portion 13 and the main body 11 do not overlap with each other, with the staged surface constituting an edge surface.

The reflecting member 15 is constituted of a frame body 16 formed in a roughly rectangular shape, a connecting portion 17 formed at the outer edge of the frame body 16 and a reflecting portion 18 formed at the inner edge of the frame body 16.

The connecting portion 17 extends out from the outer edge of the frame body 16 at an angle that is the same as the angle of a projecting portion 8 relative to the frame body 16, so that the connecting portion 17 and the projecting portion 8 can be placed in contact with each other as necessary.

In addition, the frame body 16 is formed as a flat plate extending almost parallel to the rear side surface of the flange 12 over a specific distance, and is continuous to and in contact with the reflecting portion 18 at the boundary of the portion of the flange 12 that does not overlap the main body 11 and the thick portion 13.

The reflecting portion 18 approaches the window member 10 as it extends from the side where the frame body 16 is provided toward the front end, and comes in contact with a corner portion constituted of the stage at the window portion 10 at its middle area with its end portion coming into contact with the main body 11 of the window member 10. The reflecting portion 18 is provided with a flat reflecting surface 14 at the side where the thick portion 13 is provided, with the reflecting surface 14 inclined at an angle of inclination alpha of 45° relative to the external surface of the main body 11. In addition, if a metal member is used to constitute the reflecting member 15, the reflecting surface may be achieved through, for instance, mirror finishing, whereas if a resin material is used to constitute the reflecting member 15, the reflecting surface 14 may be formed through plate coating. However, the reflecting surface 14 at the reflecting portion 18 does not necessarily have to be formed as a flat surface, and may be constituted as a curved surface. In addition, the angle of inclination alpha of the reflecting surface is not limited to 45° as long as a reflecting angle beta, which allows the internal circumferential surface of the second opening portion 7b to be reflected as a virtual image on the surface of the portion of the main body 11 that overlaps the thick portion 13 is achieved.

Thus, as illustrated in FIG. 4B, when the window member 10 is viewed from the center front relative to the thick portion 13, the internal circumferential surface of the second opening portion 7b is seen at the reflecting surface 14 of the reflecting member 15 to be reflected as a virtual image on the surface of the portion of the main body 11 that overlaps the reflecting surface 14 over a specific color width delta from the end of the main body 11 of the window member 10, i.e., from the opening width, so that the black color of the panel 2 is seen as the color of the portion of the main body 11 that overlaps the reflecting surface 14. In addition, as illustrated in FIG. 3B, when the window member 10 is viewed from below in a diagonal direction, the edge surface toward the center of the window member 10 is hidden by the reflecting member 15 and the portion of the reflecting member 15 where the reflecting surface 14 is provided is closer to the window member toward the main body rather than toward the panel. Because of this, even when the window member 10 is viewed from below in a diagonal direction, the surface on the opposite side from the reflecting surface 14 of the reflecting portion 18 at the reflecting member 15 does not reflect light, thereby making it possible to prevent the main body from appearing to have double lines toward the center from the side edges of the opening portion.

Thus, with the window structure of an indicator unit illustrated in FIGS. 3A and 3B, even when the window member is viewed from the center front direction relative to the thick portion, reflection at the reflecting surface causes the color of the panel to be seen over a specific width from the end of the main body of the window member, i.e., from the opening portion, to prevent the color of the portion of the main body that overlaps the thick portion from looking different from the color of the panel and the color of the other portions of the main body, as has been the case in the prior art, to prevent the circumferential edge of the opening portion of the main body from taking on the appearance of a picture frame, and therefore people can look at the window member and will not feel it is an inferior product.

In addition, by adopting the window structure of the indicator unit Illustrated in FIGS. 3A and 3B, the necessity for actually coloring the surface of the thick portion at the internal side of the panel for the purpose of improving the external appearance of the window member of the indicator unit is eliminated, thereby preventing the manufacturing process from becoming complicated and preventing an increase in the production cost.

Furthermore, by adopting the window structure of the indicator unit illustrated in FIGS. 3A and 3B, the thickness of the thick portion is continuously increased toward the external circumference to eliminate the edge surface toward the center of the window member. As a result, no light is reflected or absorbed to look dark, to prevent the main body from appearing to have double lines toward the center relative to the side edges of the opening portion to improve the appearance of the window member of the indicator unit.

Moreover, with the window structure of an indicator unit illustrated in FIGS. 4A and 4B, even when the window member is viewed from the center front direction relative to the thick portion, reflection at the reflecting surface causes the color of the panel to be seen over a specific width from the end of the main body of the window member, i.e., from the opening portion, to prevent the color of the portion of the main body that overlaps the thick portion from looking different from the color of the panel and the color of the other portions of the main body. Thus, the circumferential edge of the opening portion of the main body does not take on the appearance of a picture frame, and therefore people can look at the window member and will not feel it is an inferior product.

In addition, with the window structure of the indicator unit illustrated in FIGS. 4A and 4B, even when the window member is viewed from below in a diagonal direction, the edge surface at the center of the window member is hidden by the reflecting member and furthermore, the portion of the reflecting member where the reflecting surface is provided is closer to the window member toward the main body than toward the panel. Consequently, no light is reflected to look shiny to prevent the main body from appearing to have double lines toward the center relative to the side edges of the opening portion, thereby achieving an improvement in the external appearance of the window member.

What is claimed is:

1. A window structure of an indicator unit, comprising:
   an opening portion at a panel that is constituted of an opaque member, comprising a first opening portion opening at an external surface of said panel and a second opening portion continuous to said first opening portion and opening toward an internal surface of said panel over a larger internal circumferential width than said first opening portion; and
   a window member through which information can be seen, fitted at said opening portion and constituted of a main body whose side edge portion faces opposite a side circumferential surface of said first opening portion and a flange whose side edge portion faces opposite a side circumferential edge of said second opening portion, wherein:
   said flange is provided with a thick portion at an area that overlaps said main body; and
   a means for reflection at which said side circumferential surface of said second opening portion of said panel is reflected is provided over at least a portion of said main body of said window member that overlaps said thick portion.

2. A window structure of an indicator unit according to claim 1, wherein:
   said means for reflection is constituted by continuously increasing a thickness of said thick portion toward an external circumference of said window member to form an internal surface side of said thick portion as a reflecting surface.

3. A window structure of an indicator unit according to claim 2, wherein:
   said reflecting surface is constituted as a flat surface inclining at a specific angle relative to a surface of said main body of said window member.

4. A window structure of an indicator unit according to claim 3, wherein:
   said flat surface inclines at an angle of inclination of 45° relative to said surface of said main body of said window member.

5. A window structure of an indicator unit according to claim 2, wherein:
   said reflecting surface is constituted as a curved surface inclining at a specific angle relative to a surface of said main body of said window member.

6. A window structure of an indicator unit according to claim 5, wherein:
   said curved surface inclines at an angle of inclination of 45° relative to said surface of said main body of said window member.

7. A window structure of an indicator unit according to claim 1, wherein:
   said means for reflection is constituted by providing a reflecting member at an internal surface side of said thick portion and constituting a reflecting surface with a surface of said reflecting member that inclines at a specific angle relative to a surface of said main body of said window member.

8. A window structure of an indicator unit according to claim 7, wherein:
   said reflecting surface is constituted by forming said reflecting member with a metal material and by mirror finishing a surface of said reflecting member that inclines at a specific angle relative to said surface of said main body of said window member.

9. A window structure of an indicator unit according to claim 7, wherein:

said reflecting surface is constituted by forming said reflecting member with a synthetic resin material and by plate coating a surface of said reflecting member that inclines at a specific angle relative to said surface of said main body of said window member.

10. A window structure of an indicator unit according to claim 7, wherein:

said surface of said reflecting member that constitutes said reflecting surface is a flat surface inclining at an angle of inclination of 45° relative to said surface of said main body of said window member.

11. A window structure of an indicator unit according to claim 1, wherein:

said window member is constituted of polymethyl methacrylate.

12. A window structure of an indicator unit according to claim 1, wherein:

said panel is constituted of acrylonitrile-butadiene-styrene.

* * * * *